(12) United States Patent
Soni et al.

(10) Patent No.: US 12,724,658 B2
(45) Date of Patent: Sep. 1, 2026

(54) USING THREAD CPU UTILIZATION PATTERNS TO ANALYZE STORAGE NODE PERFORMANCE PROBLEMS

(71) Applicant: Dell Products L.P., Hopkinton, MA (US)

(72) Inventors: Pankaj Soni, Sikar (IN); Ramesh Doddaiah, Westborough, MA (US); Malak Alshawabkeh, Franklin, MA (US); Eddie Tran, Lowell, MA (US); Garima Jain, Westford, MA (US)

(73) Assignee: Dell Products L.P., Hopkinton, MA (US)

( * ) Notice: Subject to any disclaimer, the term of this patent is extended or adjusted under 35 U.S.C. 154(b) by 461 days.

(21) Appl. No.: 18/406,269

(22) Filed: Jan. 8, 2024

(65) Prior Publication Data

US 2025/0224994 A1 Jul. 10, 2025

(51) Int. Cl.
*G06F 11/07* (2006.01)

(52) U.S. Cl.
CPC ........ *G06F 11/079* (2013.01); *G06F 11/0715* (2013.01); *G06F 11/0727* (2013.01)

(58) Field of Classification Search
CPC ............. G06F 11/0715; G06F 11/0724; G06F 11/0727; G06F 11/079; G06F 11/3017; G06F 11/302; G06F 11/3024; G06F 11/3034; G06F 11/3409
See application file for complete search history.

(56) References Cited

U.S. PATENT DOCUMENTS

| | | | | |
|---|---|---|---|---|
| 7,530,072 B1 * | 5/2009 | Cheaz | G06F 21/53 | 712/216 |
| 7,657,893 B2 * | 2/2010 | Armstrong | G06F 9/50 | 712/229 |
| 2003/0196136 A1 * | 10/2003 | Haynes | G06F 11/3495 | 714/13 |
| 2005/0229176 A1 * | 10/2005 | Findeisen | G06F 11/3423 | 718/100 |
| 2014/0067912 A1 * | 3/2014 | Vutukoori | G06F 11/0748 | 709/203 |
| 2018/0052728 A1 * | 2/2018 | Rupp | G06F 11/0775 | |
| 2020/0409781 A1 * | 12/2020 | Zhen | G06F 11/3006 | |
| 2025/0068507 A1 * | 2/2025 | Mehta | G06F 11/079 | |

* cited by examiner

*Primary Examiner* — Gabriel Chu
(74) *Attorney, Agent, or Firm* — Anderson Gorecki LLP

(57) ABSTRACT

Thread CPU cycle utilization patterns are used to analyze storage array performance problems. Per-thread CPU cycle utilization statistics are monitored, and code path utilizations are counted. Time-series clustering is used to identify code path activity clusters and thread clusters having similar CPU cycle utilization patterns. The most active code paths are selected from each code path activity cluster. The thread clusters that are most highly correlated with the selected code paths are selected and ranked based on CPU cycle utilization.

20 Claims, 5 Drawing Sheets

| emulation_code | pid | description | avg_percent | cluster_id |
|---|---|---|---|---|
| E1 | pid164 | vp_eu_72 | 0.46 | 18 |
| E1 | pid195 | vp_eu_74 | 0.51 | 18 |
| E1 | pid182 | vp_eu_73 | 0.49 | 18 |
| E1 | pid208 | vp_eu_75 | 0.51 | 18 |
| 0A | pid117 | cdi_00.00 | 1.05 | 19 |
| 0A | pid118 | cdi_00.01 | 1.23 | 19 |
| 8A | pid85 | msgECHO | 1.14 | 19 |
| 0A | pid82 | msgTunl | 1.15 | 19 |
| 8A | pid88 | msgRECV1 | 1.34 | 20 |
| 8A | pid80 | msgSQ1 | 1.60 | 20 |
| 0A | pid83 | msgECHO | 1.69 | 20 |
| E1 | pid359 | vp_skim_skt_1 | 1.53 | 20 |

USING THREAD CPU UTILIZATION PATTERNS TO ANALYZE STORAGE NODE PERFORMANCE PROBLEMS

TECHNICAL FIELD

The subject matter of this disclosure is generally related to data storage systems.

BACKGROUND

Electronic data storage is a critical infrastructure for organizations that rely on software for business processes. A typical datacenter includes clusters of server computers and data storage nodes that are interconnected via network switches. The data storage nodes may include, or be part of, storage arrays, storage area networks (SANs), and network-attached storage (NAS), for example, and without limitation. The servers run instances of host applications that support organizational processes such as email, accounting, inventory control, e-business, and engineering. Host application data is maintained by the storage nodes. Input-output (IO) commands are sent by the servers to the storage nodes to access storage objects on which the host application data is logically stored. Storage node performance can be measured in terms of IO access latency, which is elapsed time between receipt of an IO command from a server and transmission of a corresponding response (data or ACK) to the server.

SUMMARY

A method in accordance with some implementations comprises: monitoring per-thread utilization of central processing unit (CPU) cycles in a storage system that comprises at least one storage director with CPU complexes configured to run threads comprising threads of emulations that perform storage-related tasks; identifying clusters of the threads that are most highly correlated with utilizations of code paths comprising sets of multiple thread types that function together to perform a specific task; and using the identified clusters of threads to identify at least one of the threads as a cause of a performance problem of the storage system.

An apparatus in accordance with some implementations comprises: a storage system comprising at least one storage director with central processing unit (CPU) complexes configured to run threads comprising threads of emulations that perform storage-related tasks and a process configured to: monitor per-thread utilization of CPU cycles; identify clusters of the threads that are most highly correlated with utilizations of code paths comprising sets of multiple thread types that function together to perform a specific task; and use the identified clusters of threads to identify at least one of the threads as a cause of a performance problem of the storage system In accordance with some implementations, a non-transitory computer-readable storage medium stores instructions that when executed by a computer perform a method comprising: monitoring per-thread utilization of central processing unit (CPU) cycles in a storage system that comprises at least one storage director with CPU complexes configured to run threads comprising threads of emulations that perform storage-related tasks; identifying clusters of the threads that are most highly correlated with utilizations of code paths comprising sets of multiple thread types that function together to perform a specific task; and using the identified clusters of threads to identify at least one of the threads as a cause of a performance problem of the storage system.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and storage arrays. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
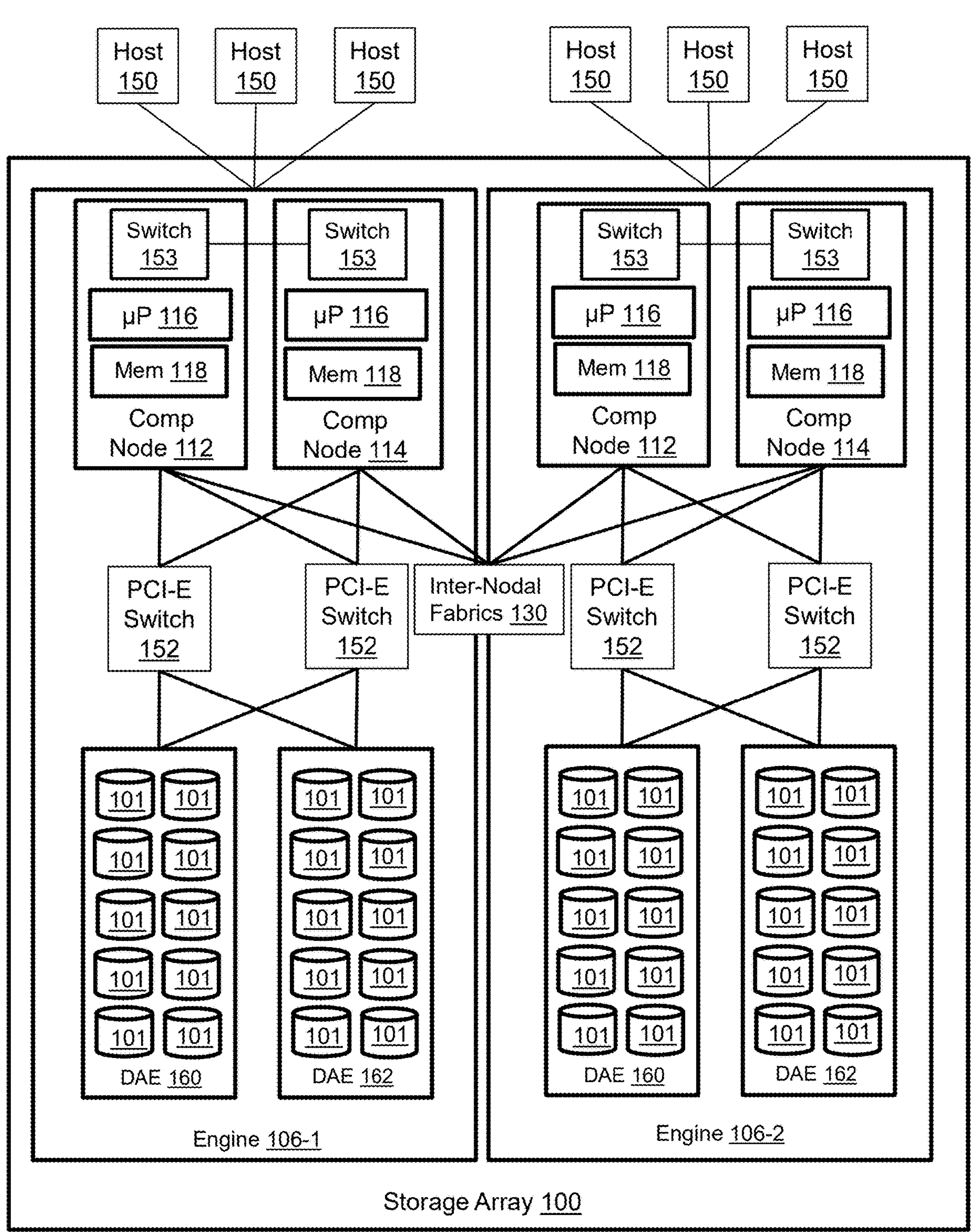
FIG. 1 illustrates a storage array for which thread CPU utilization patterns are used to analyze storage array performance problems.

FIG. 1 illustrates a storage array 100 for which thread CPU utilization patterns are used to analyze storage array performance problems. Storage array 100 is shown with two engines 106-1, 106-2, but might include any number of engines. Each engine includes a pair of compute nodes 112, 114 (aka storage directors) that are interconnected via peripheral component interconnect express (PCI-E) switches 153 and disk array enclosures (DAEs) 160, 162. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board (PCB) and includes hardware resources such as multi-core processors 116 and local memory 118. Processors 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array using remote direct memory access (RDMA). Each compute node includes one or more adapters and ports for communicating with host servers 150 to service IOs from the host servers. Each compute node also includes one or more adapters for communicating with other compute nodes via redundant inter-nodal channel-based InfiniBand fabrics 130.

Figure 2:
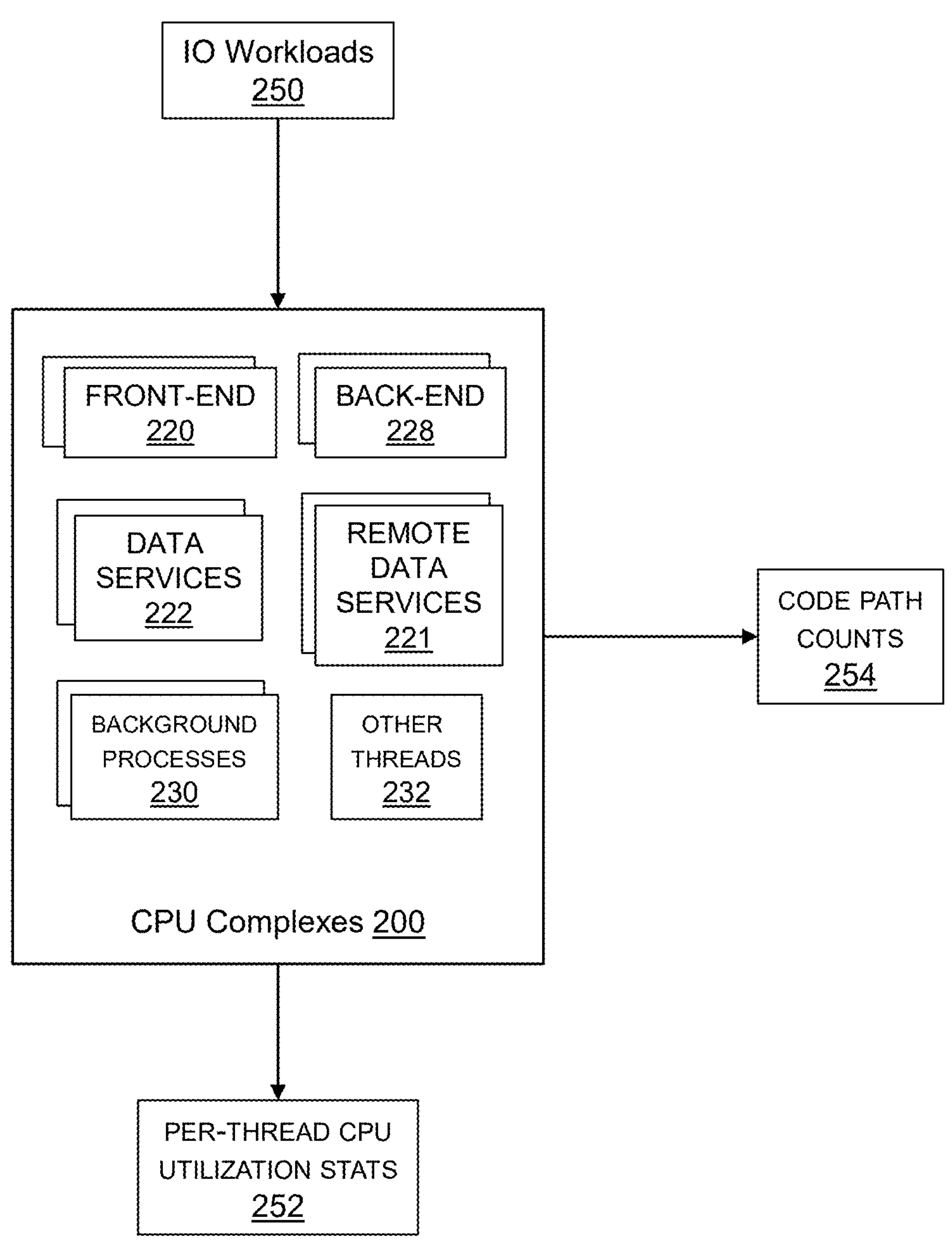
FIG. 2 illustrates monitoring of threads running on CPU complexes of the storage array.

Referring to FIGS. 1 and 2, the storage array processors 116, collectively represented as central processing unit (CPU) complexes 200, run various emulations for completing different storage-related tasks and functions. Each emulation includes a process with multiple worker threads running on a core. Threads of front-end emulations 220 handle communications with the host servers 150. For example, front-end emulation threads receive IO commands from host servers and return data and write acknowledgements (ACKs) to the host servers. Threads of back-end emulations 228 handle communications with managed drives 101 in the DAEs 160, 162, e.g., to read and write data from and to the managed drives. Threads of data services emulations 222 process IOs. For example, data services emulation threads maintain metadata that maps between logical block addresses of the storage objects to which IOs from the host applications are directed and the physical addresses on the managed drives. The data services emulation threads maintain the shared memory in which data is temporarily copied to service IOs. For example, Read IOs characterized as “read-miss” prompt a data services emulation thread to cause a back-end emulation thread to copy the data from the managed drives into the shared memory. The data services emulation thread then causes the front-end emulation thread to return the data to the host application. In the case of a “read-hit” in which the data is already in shared memory when the IO is received, the data is accessed from the shared memory without being copied from the managed drives by the back-end emulation thread in response to the IO. Write IOs prompt the data services emulation threads to copy the data into the shared memory, generate write acknowledgements, and eventually prompt back-end emulation threads to destage the data to the managed drives. Threads of remote data services emulations 221 handle communications with other storage systems, e.g., other storage arrays for remote replication and remote snapshot creation. Threads of background processes 230 perform a variety of functions including, but not limited to, recycling data slots in the shared memory and migrating data between volumes and drives. A wide variety of other threads 232 that may or may not perform storage-related tasks or functions may also run on the CPU complexes 200.

The CPU complexes simultaneously run thousands of threads. Among the emulation threads, consumption of CPU cycles is a function of a wide variety of characteristics of IO workloads. For example, CPU utilization by the various emulation threads varies based on IO type, IO size, and IOs per second (IOPS) received, among other characteristics. Moreover, CPU utilization by all instances of a thread type are not necessarily equal, and thread CPU utilization is time-variable. Still further, CPU utilization by different types of threads may be related or interdependent. Consequently, it is difficult to identify specific threads as likely sources of storage array performance problems.

In order to use thread CPU utilization patterns to analyze performance problems, the threads running on the CPU complexes 200 are monitored as IO workloads 250 are serviced by the storage array. Specifically, individual threads are monitored to compute per-thread CPU utilization statistics 252 and counts 254 of utilizations of code paths. A code path is a procedure that uses multiple threads in a coordinated way to perform a specific task. For example, a front-end emulation thread receiving an IO command that a data services emulation thread helps to service by locating the associated metadata that maps the logical block addresses of the IO and that a back-end emulation thread then helps to service by fetching the corresponding data from the managed drives is a code path including three distinct worker threads. Other examples of code paths have already been described above. Each code path may be characterized by a set of thread types that work together in a predetermined order to perform a specific task. A given use of a code path does not necessarily involve the same worker threads instances each time the code path is used but does involve instances of the same types of worker threads. A separate counter is created for each code path. The counter for a code path is incremented whenever the associated code path is invoked, e.g., by enqueueing an IO to be inputted to the code path. The counters may be polled periodically and reset after storing the monitored counts 254.

Figure 3:
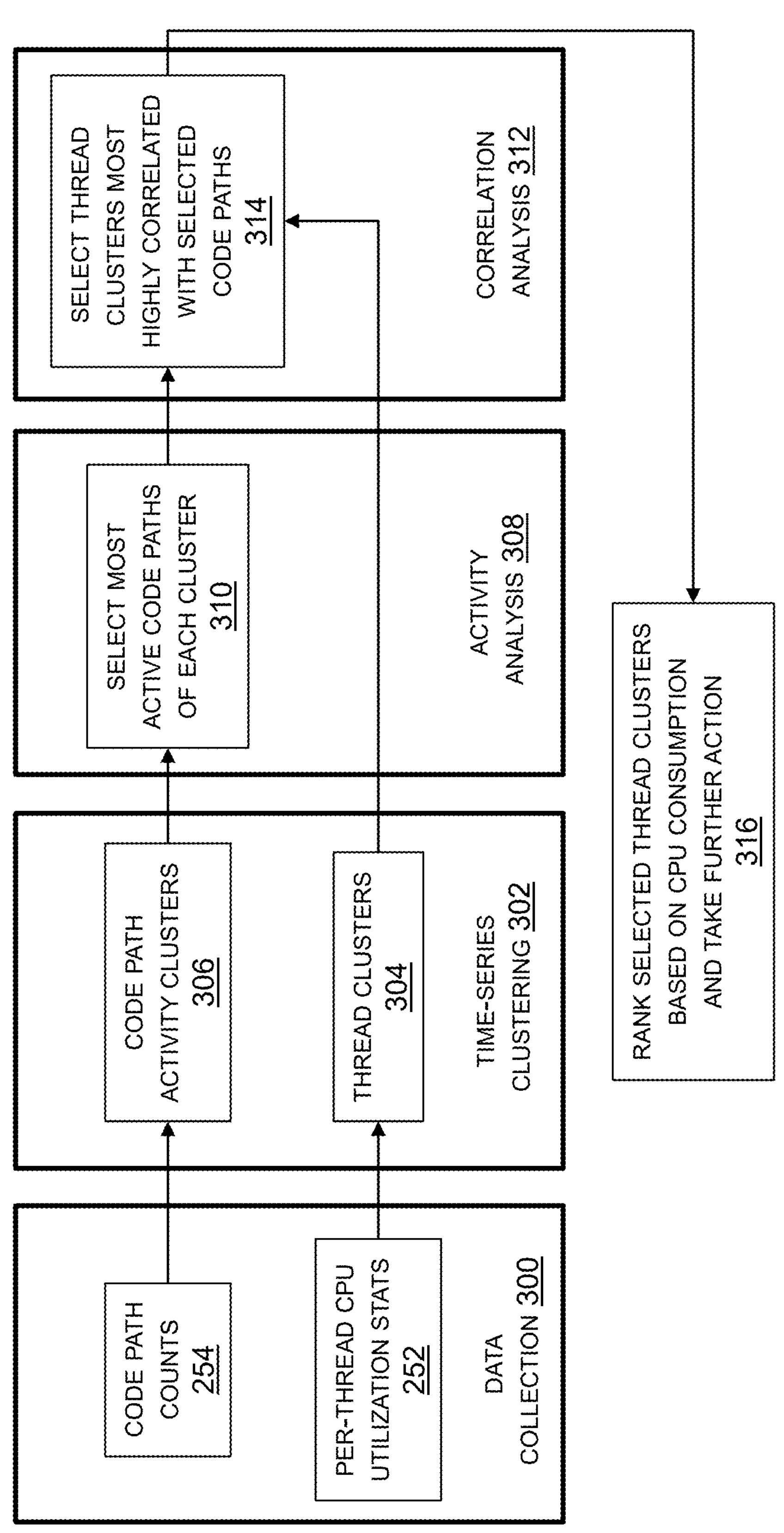
FIG. 3 illustrates a method of using thread CPU utilization patterns to analyze performance problems.

FIG. 3 illustrates a method of using thread CPU utilization patterns to analyze performance problems. In data collection phase 300 the monitored code path counts 252 and per-thread CPU utilization statistics 252 are collected. In a time-series clustering phase 302 the code path counts 252 and per-thread CPU utilization statistics 252 are subjected to time-series analysis to identify clusters. Specifically, clusters of threads that exhibit similar CPU utilization are identified in step 304 and clusters of code paths that exhibit similar activity levels are identified in step 306. In activity analysis phase 308 the most active code paths of each cluster are identified and selected in step 310. In a correlation analysis phase 312 the thread clusters that are most highly correlated with the selected code paths are identified and selected in step 314. The selected thread clusters are then ranked based on CPU cycle consumption in step 316. Further action is taken based on the ranking, e.g., further analyzing, suspending, or disabling threads of the clusters in order by rank from highest CPU cycle consumption to lowest CPU cycle consumption to confirm which clusters and which threads of those clusters are the cause of the performance problem, e.g., due to inefficient usage of CPU cycles.

Figure 4:
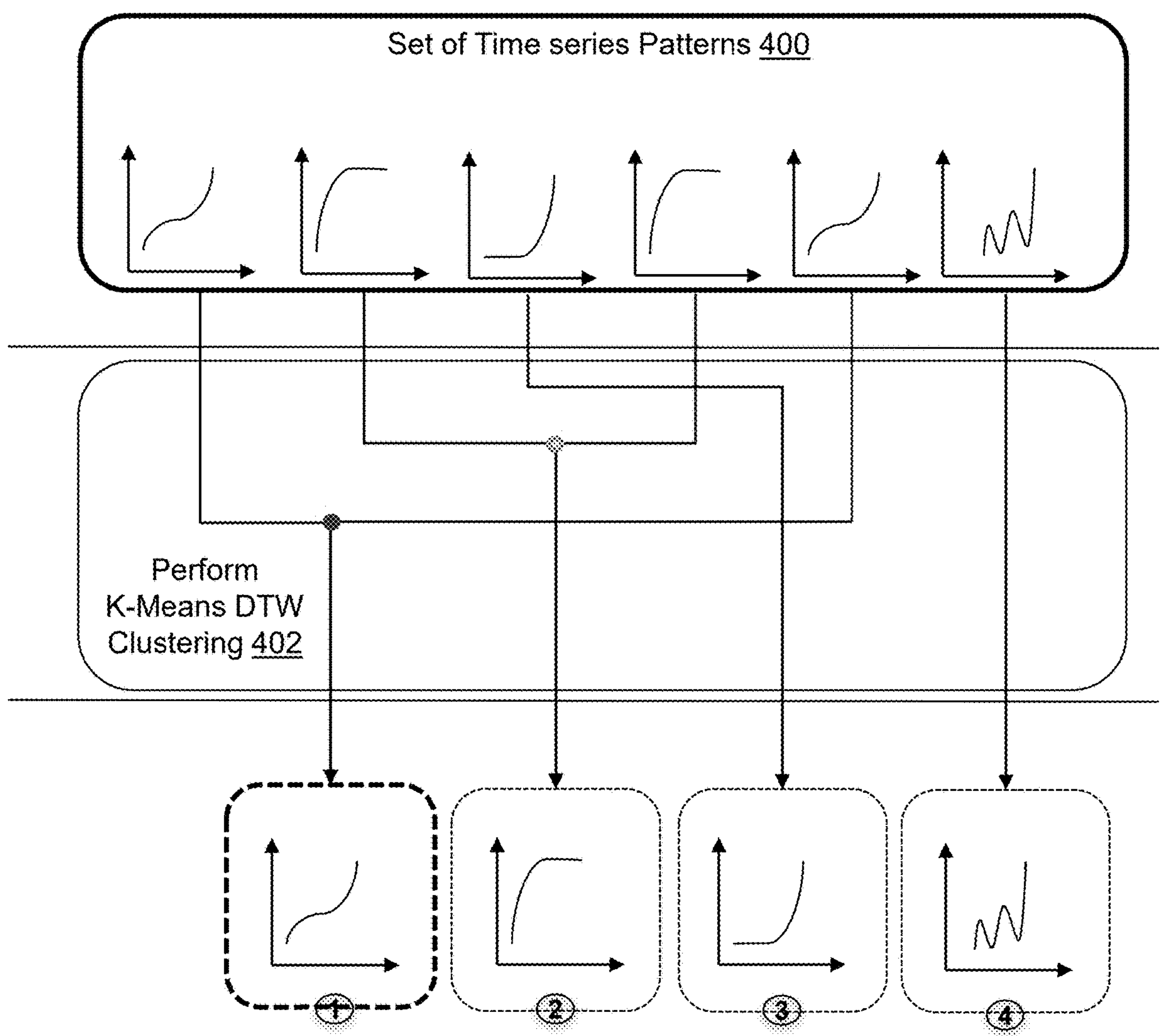
FIG. 4 illustrates time-series clustering of threads in greater detail.

FIG. 4 illustrates time-series clustering of threads in greater detail. A set of time-series patterns 400 are analyzed using K-means dynamic time warping (DTW) clustering 402 to identify distinct patterns 1, 2, 3, 4. K-means clustering partitions the set of CPU utilization objects into K clusters in such a way that the sum of the squared distances between the objects and their assigned cluster mean is minimized. Dynamic time warping finds an optimal alignment between two time-dependent sequences by time-warping the sequences in a nonlinear fashion to better match each other. The elbow method is used to find the optimal number of clusters in K-means by determining the number of centroids (k) by continuously iterating for k=1 to k=n and, for every value of k, calculating the within-cluster sum of squares (WCSS) value.

Figure 5:
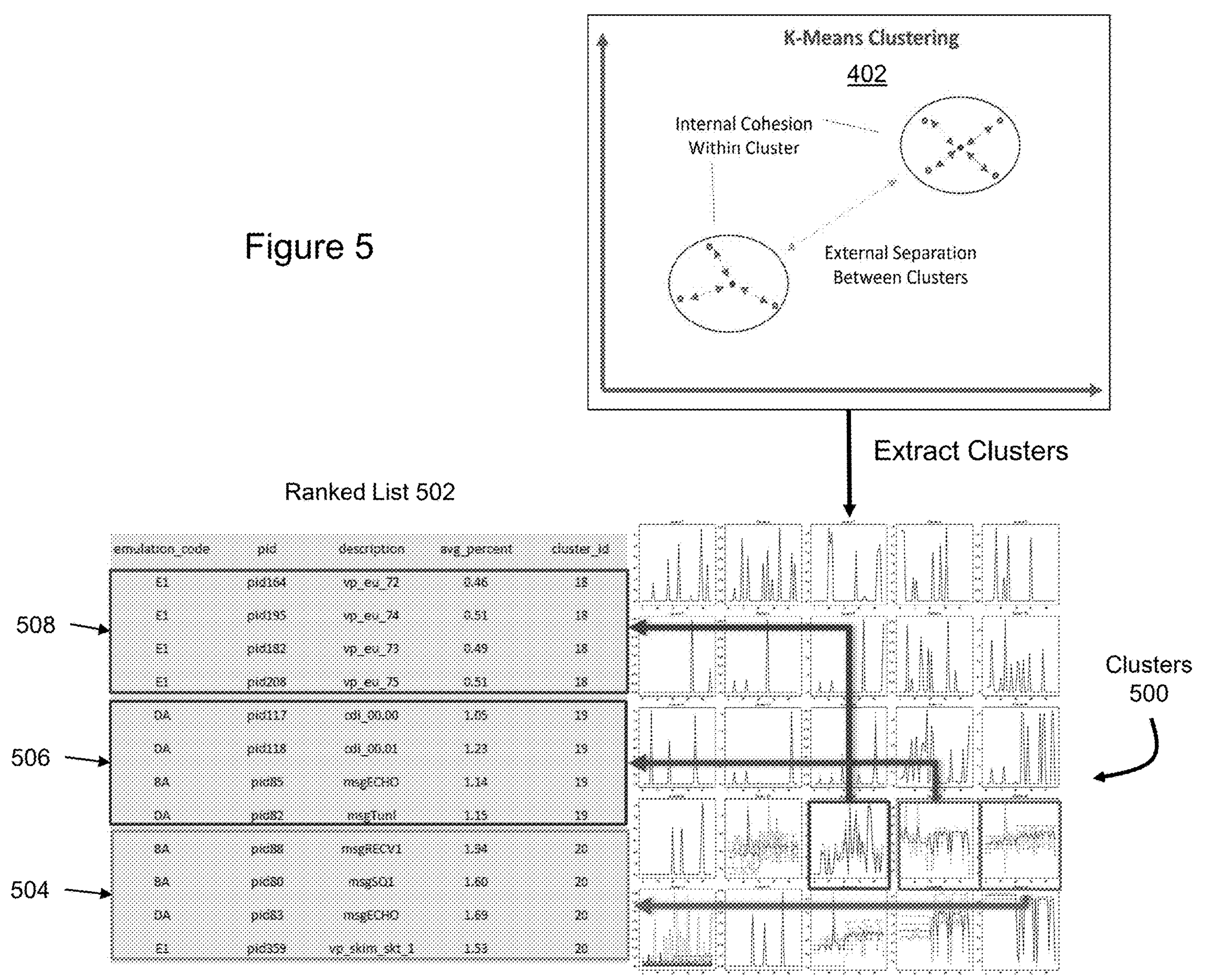
FIG. 5 illustrates time-series clustering of code paths in greater detail.

FIG. 5 illustrates time-series clustering of code paths in greater detail. Individual clusters 500 are extracted from the result of the K-means DTW clustering 402 described above. A ranked list 502 includes the thread clusters that are most highly correlated with the selected code paths and the individual threads within those clusters. In the illustrated example, threads in cluster 504 are found to consume more CPU cycles than threads in clusters 506, 508. Threads in cluster 508 are found to consume fewer CPU cycles than threads in clusters 504, 506.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:

monitoring per-thread utilization of central processing unit (CPU) cycles in a storage system that comprises at least one storage director with CPU complexes configured to run threads comprising threads of emulations that perform storage-related tasks;

identifying clusters of the threads that are most highly correlated with utilizations of code paths comprising sets of multiple thread types that function together to perform a specific task; and using the identified clusters of threads to identify at least one of the threads as a cause of a performance problem of the storage system.

2. The method of claim 1 further comprising monitoring code path activity by counting the utilizations of the code paths.

3. The method of claim 2 further comprising identifying clusters of the threads that exhibit similar CPU cycle utilization patterns.

4. The method of claim 3 further comprising identifying clusters of the code paths that exhibit similar activity.

5. The method of claim 4 further comprising selecting code paths of each of the identified clusters based on activity.

6. The method of claim 5 further comprising selecting the thread clusters most highly correlated with the selected code paths.

7. The method of claim 6 further comprising ranking the selected thread clusters based on CPU cycle consumption.

8. An apparatus comprising:

a storage system comprising at least one storage director with central processing unit (CPU) complexes configured to run threads comprising threads of emulations that perform storage-related tasks and a process configured to:

monitor per-thread utilization of CPU cycles;

identify clusters of the threads that are most highly correlated with utilizations of code paths comprising sets of multiple thread types that function together to perform a specific task; and use the identified clusters of threads to identify at least one of the threads as a cause of a performance problem of the storage system.

9. The apparatus of claim 8 further comprising the process configured to monitor code path activity by counting the utilizations of the code paths.

10. The apparatus of claim 9 further comprising the process configured to identify clusters of the threads that exhibit similar CPU cycle utilization patterns.

11. The apparatus of claim 10 further comprising the process configured to identify clusters of the code paths that exhibit similar activity.

12. The apparatus of claim 11 further comprising the process configured to select code paths of each of the identified clusters based on activity.

13. The apparatus of claim 12 further comprising the process configured to select the thread clusters most highly correlated with the selected code paths.

14. The apparatus of claim 13 further comprising the process configured to rank the selected thread clusters based on CPU cycle consumption.

15. A non-transitory computer-readable storage medium storing instructions that when executed by a storage system that comprises at least one storage director with central processing unit (CPU) complexes configured to run threads comprising threads of emulations that perform storage-related tasks perform a method comprising:

monitoring per-thread utilization of CPU cycles;

identifying clusters of the threads that are most highly correlated with utilizations of code paths comprising sets of multiple thread types that function together to perform a specific task; and using the identified clusters of threads to identify at least one of the threads as a cause of a performance problem of the storage system.

16. The non-transitory computer-readable storage medium of claim 15 in which the method further comprises monitoring code path activity by counting the utilizations of the code paths.

17. The non-transitory computer-readable storage medium of claim 16 in which the method further comprises identifying clusters of the threads that exhibit similar CPU cycle utilization patterns.

18. The non-transitory computer-readable storage medium of claim 17 in which the method further comprises identifying clusters of the code paths that exhibit similar activity.

19. The non-transitory computer-readable storage medium of claim 18 in which the method further comprises selecting code paths of each of the identified clusters based on activity.

20. The non-transitory computer-readable storage medium of claim 19 in which the method further comprises selecting the thread clusters most highly correlated with the selected code paths.

* * * * *